(12) United States Patent
van der Kwaak (10) Patent No.: US 10,677,213 B2
(45) Date of Patent: Jun. 9, 2020

(54) ELECTRICAL STARTER SYSTEM FOR THE RETROFIT OF MOTORCYCLES

(71) Applicant: W & W Cycles AG, Wurzburg (DE)

(72) Inventor: Mark van der Kwaak, Leiden (NL)

(73) Assignee: W & W Cycles AG, Wurzburg (DE)

( * ) Notice: Subject to any disclaimer, the term of this patent is extended or adjusted under 35 U.S.C. 154(b) by 521 days.

(21) Appl. No.: 15/235,232

(22) Filed: Aug. 12, 2016

(65) Prior Publication Data

US 2018/0045161 A1 Feb. 15, 2018

(30) Foreign Application Priority Data

Aug. 12, 2016 (DE) .................... 20 2016 104 454 U (51) Int. Cl.
| | |
|---|---|
| *F02N 15/02* | (2006.01) |
| *F02N 15/08* | (2006.01) |
| *F02N 11/00* | (2006.01) |
| *F02N 15/00* | (2006.01) |
| *B62J 99/00* | (2020.01) |
| *F16H 7/18* | (2006.01) |

(Continued)

(52) U.S. Cl.
CPC ............. *F02N 15/08* (2013.01); *B62J 99/00* (2013.01); *F02N 11/00* (2013.01); *F02N 11/08* (2013.01); *F02N 15/006* (2013.01); *F02N 15/02* (2013.01); *F16H 7/06* (2013.01); *F16H 7/18* (2013.01); *B62J 45/00* (2020.02); *F02D 2400/11* (2013.01); *F02N 15/022* (2013.01); *F16H 2007/0872* (2013.01); *F16H 2007/0891* (2013.01)

(58) Field of Classification Search
CPC .. B62M 2701/0092; B62M 2701/0015; B62M 9/16; F02N 15/02; F02N 15/006; F02N 15/067; F02D 2400/11

USPC ............................................ 180/231; 74/7 C
See application file for complete search history.

(56) References Cited

U.S. PATENT DOCUMENTS

| | | |
|---|---|---|
| 6,273,207 B1 | 8/2001 | Brown |
| 7,051,824 B1 | 5/2006 | Jones et al. |

(Continued)

OTHER PUBLICATIONS

Tech Cycle Performance Products Inc., Pan Head Electric Start Kit Swingarm Oil Tank Installation Instructions, Apr. 30, 2015, Tech Cycle (Year: 2015).*

(Continued)

*Primary Examiner* — Randell J Krug
(74) *Attorney, Agent, or Firm* — Frank H. Foster; Kremblas & Foster (57) ABSTRACT

An electrical starter system and construction kit for retrofitting Harley-Davidson motorcycles built from 1936 to 1957 with a mechanical starting device. The starter system includes a clutch device that can be coupled to the transmission main shaft for transmitting rotary motion having at least one starter gearwheel, a clutch hub, a clutch cage that can be or is attached to the hub for transmitting a rotary motion and an electrical starter motor with a starter shaft pinion that can be driven by the electrical motor for engaging the starter gearwheel. The starter gearwheel can be mechanically coupled to the clutch hub for transmitting a rotary motion to the hub. Preferably, a gearwheel/hub adapter couples the clutch hub and the starter gearwheel. The adapter is or can be coupled to the starter gearwheel and the clutch hub and is or can be coupled to a transmission main shaft.

12 Claims, 6 Drawing Sheets

(51) Int. Cl.
*F16H 7/06* (2006.01)
*F02N 11/08* (2006.01)
*F16H 7/08* (2006.01)
*B62J 45/00* (2020.01)

(56) References Cited

U.S. PATENT DOCUMENTS

| | | | |
|---|---|---|---|
| 7,478,695 B2 * | 1/2009 | Leppanen | F02N 15/006 |
| | | | 180/219 |
| 7,549,493 B1 | 6/2009 | Jones | |
| 2007/0017466 A1 | 1/2007 | Leppanen et al. | |

OTHER PUBLICATIONS

Tech Cycle Performance Products Inc., Panhead Electric Starter Installing Tech Cycle Indian Larry Kit, Apr. 30, 2015, Tech Cycle (Year: 2015).*

Jeff G. Holt, 3-Guyz Belt-To-Chain Conversion, Feb. 24, 2011, Hot Bike the Custom Motorcycle Magazine (Year: 2011).*

Greg Field, Original Harley-Davidson Panhead, 2002, MBI Publishing Company, p. 124 (Year: 2002).*

W&W Cycles AG, How to Use, www.wwag.com, May 24, 2016, pp. 1-9, Würzburg, Germany.

* cited by examiner

ELECTRICAL STARTER SYSTEM FOR THE RETROFIT OF MOTORCYCLES

BACKGROUND OF THE INVENTION

The invention relates to an electrical starter system for the retrofit of motorcycles, which starter system is to replace or complement the mechanical starter system, the so-called kick starter. For the sake of simplicity, the electrical starter system will hereinafter be called "the starter" and the mechanical starter system will be called "the kick starter". The invention further relates to a motorcycle equipped with this starter system.

The crankshaft must be accelerated to a minimum speed to enable the engine of a motorcycle to start. This requires the generation of an external torque, which can be transmitted to the crankshaft directly or indirectly using a gearwheel, a belt, or a chain.

A kick starter is a lever consisting of a pedal and a kick arm. This lever is mostly fastened on the left side of the motorcycle. A rider's forceful kick of the kick starter generates a rotary motion which accelerates the crankshaft to the speed required for starting the engine. Kick starters were necessary before the invention of the starter, and they were very common before starters were installed as standard equipment. Many motorcycles of older model years are still equipped with a kick starter today.

The starter has gradually replaced the kick starter due to its increased convenience. The starter provides the rotary motion for motorcycles by means of an electric motor that is operated by a start button on the handlebar or on the electric motor itself. The shaft of the electric motor has a gearwheel, hereinafter called the starter shaft pinion, mounted to its end and transmits the resulting rotary motion to a drive gear, hereinafter called the starter gear. The starter button is pressed until the motorcycle rider hears that the engine has started.

In addition to direct transmission to the crankshaft, the rotary motion can also be transmitted indirectly via the transmission main shaft. In motorcycles of the Harley-Davidson brand, the engine and the transmission are housed in separate casings. The kick starter and starter therefore act via a starter gear onto the transmission main shaft from which the motion is passed on to the crankshaft of the engine via a so-called primary drive using a chain or belt.

Motorcycles of the Harley-Davidson brand built before 1964 were all originally equipped with a kick starter. Many owners are interested in retrofitting them with a starter because of the more convenient starting process. The problem is that the space required for the additional components (electric motor, switch, associated mounting brackets, starter shaft pinion, starter gear) were not anticipated and planned for. While all motorcycles of the Harley-Davidson brand built between 1936 and 1957 were designed for two different engine types, the panhead engine and the knucklehead engine, a specific variant of the unsprung rigid frame provided an overarching common feature. The shape of the rigid frame and the original components used then provide the basis for the concept, design and assembly of an electrical starter system for the retrofit of motorcycles of the Harley-Davidson brand built between 1936 and 1957.

A construction kit for the retrofit of motorcycles of the Harley-Davidson brand built in the respective period is known, for example, from TechCycle. The electric motor and the associated magnetic switch are screwed onto the transmission base plate on the rigid frame using two brackets. To provide the required space, the oil tank located above the electric motor must be replaced by a new design. To allow transmission of the rotary motion at the clutch to the transmission main shaft, the original primary drive (in its original design as a chain drive) must be replaced by a primary drive system of a later year of construction (this later design being a belt drive instead of a chain drive) in which a starter gear visible from outside is already integrated.

The disadvantage of this known construction kit is that the replacement of the primary drive system and the oil tank causes extra costs.

It is the problem of this invention to provide an improved electric starter construction kit for the retrofit of Harley-Davidson motorcycles built from 1936 to 1957 with a starter with as few visible constructional changes as possible. Owners of these old Harley-Davidson motorcycles are often interested in keeping the original components and in leaving the optical appearance of the motorcycle unchanged. Any components required in addition have to be designed and arranged such that the primary drive system, the oil tank, and the rear fender can still be used. Necessary processing steps of the original components or equivalent model year specific replacement parts should be performed such that they will not change the optical appearance of the motorcycle and retain the full functionality of the components.

The electrical starter system specified in claim 1 is proposed to solve this problem. The dependent claims disclose optional, advantageous embodiments of the invention.

SUMMARY OF THE INVENTION

The invention is intended to retrofit Harley-Davidson motorcycles of the 1936-1957 years of manufacture with an electrical starter. The starter gear required for transmitting the rotary motion to the transmission main shaft in the starting process is coupled to the clutch hub, wherein the original part or an equivalent replacement part is used for the clutch. A starter shaft pinion driven by the electric motor engages in the starter gear during the starting process and allows transmission of the rotary motion of the starter gear to the transmission main shaft.

An adapter is introduced between the starter gear and the clutch hub for a rotationally rigid connection of the starter gear and the clutch hub to one another on the one hand and to the transmission main shaft on the other. Clutch hub, adapter, and starter gear are pushed together one after the other onto the transmission main shaft.

The starter gear and the clutch hub are welded together to couple these two components in accordance with the stresses at this point. Any positive, frictional, or cohesive connection of the starter gear to the clutch hub is conceivable as well. The rotationally rigid connection with the transmission main shaft is implemented to allow disassembly, e.g. for maintenance operations.

The adapter must have respective functional geometrical parameters to ensure a connection of starter gear and clutch hub that takes as little space as possible, resists the strains of the starting process, but at the same time allows simple disassembly and error-free re-installation of the modified clutch. Accordingly, the adapter is designed as an annular disc from which one or more protrusions extend. Therefore the clutch hub is modified such that the recess through which the transmission main shaft passes as well can enter into complementary engagement with the protrusions of the adapter.

To maintain the rotationally rigid connection or the transmission of the torque when the adapter engages in the transmission main shaft, a groove is provided on the annular disc, and protrusions in the area of the inner diameter of the annular disc. This groove acts as a driving element on the transmission main shaft of the motorcycle.

Said starter gear is mounted inside the primary drive gearbox. The additional starter gear on the transmission main shaft therefore necessarily has a smaller diameter than the clutch. In addition, a cutout is provided concentrically to the transmission main shaft on the inner cover of the primary drive gearbox, having the size and shape of the added starter gear. In this way, the starter gear remains hidden to a viewer behind the clutch and the outer cover of the primary drive gearbox.

According to an optional embodiment of the invention, the electrical starter system includes an output pinion that can be mounted to the crankshaft of the motorcycle to gain space on the transmission main shaft for the additional starter gear. Said pinion is designed with a projection or extension of such thickness and orientation that an offset of the primary chain drive on the transmission main shaft of the motorcycle is compensated by said thickness and orientation such that the primary chain drive of the motorcycle is flush with a plane corresponding to the offset. In extending this thought, the entire clutch on the transmission main shaft is moved to the left in the direction of travel. For the output pinion on the transmission main shaft of the primary drive system to be flush with the output pinion of the engine thereafter, the output pinion of the engine must be offset by the same distance in the direction of travel, according to this exemplary embodiment to the left, by replacing the pinion or adding an adapter. A different output pinion has to be mounted as an embodiment in its own right to the panhead or knucklehead engine types used in the respective period.

In the preferred embodiment, the shaft of the starter shaft pinion as well as the bedding of the shaft are encased by a bell cap which only has a recess at the contact surface of the starter gear and the starter shaft pinion. In addition to the protecting and supporting function for the shaft of the starter shaft pinion, this casing also acts as a top bracket to which the casing of the electric engine and magnetic switch is fastened as well. This top bracket is screwed via a flange-type connection to a T-shaped bottom bracket on a fastening projection that projects upwards. Said bottom bracket has a plate-type surface that is screwed tightly and transversally to the fastening projection to the transmission base plate. The transmission base plate is part of the motorcycle frame. The bell cap of the top bracket is the only component which will inevitably be visible to a viewer from outside. For this purpose, a small cutout is provided in the respective area of the inner cover of the primary drive gearbox.

The top and bottom brackets are designed as single-piece cast parts to ensure good handling as well as economical production.

In the preferred embodiment, the holding parts of the starter motor are disposed in a space saving manner, such that the space provided by the modified primary drive, the original oil tank and the original rear fender is sufficient. Both holding parts are therefore located between the starter engine and the secondary drive of the motorcycle.

It is also necessary to select the magnetic switch and electric motor such that they can be arranged parallel and vertically to one another such that the permissible installation depth in the longitudinal direction of the motorcycle is not exceeded. That the permissible overall height of the starter device (predetermined by the original oil tank) is not exceeded despite the increased installation height of the starter motor can be attributed to the described design of the two holding parts.

To prevent a mechanical collision of the top bracket or the starter motor casing, respectively, with the battery bracket, which is located in the horseshoe-shaped oil tank, the retaining plate that supports the battery must be replaced without impairing functionality.

The position of the starter motor and the starter shaft pinion can not be adjusted after their first assembly. This means that the starter gear, the clutch, and the transmission main shaft also cannot be repositioned any more. Thus the typically applied method of retensioning the chain of the primary drive by moving the transmission main shaft backwards is lost. In the preferred embodiment, an additional device is therefore needed for retensioning the chain of the primary drive. This additional device is either fastened to the transmission base plate or to the crankshaft casing of the motorcycle, depending on whether the assembly is from before or after the 1954 year of manufacture. In models built from 1936 to 1954, the primary chain tensioner is screwed to a bracket on the transmission base plate. The primary chain tensioner is no longer visible behind the installed cover of the primary chain drive in both assemblies. In models built from 1955 to 1957, the primary chain tensioner is fastened to a bracket on the crankshaft casing.

Patent protection is further sought for a secondary alternative of the invention relating to an electrical starter system, in particular an electrical starter construction kit for the retrofit of motorcycles of the Harley-Davidson brand built from 1936 to 1957 with a mechanical starting device, which starting system includes the following: a clutch mechanism with at least one starter gearwheel, for example a starter gear, a clutch hub and a clutch cage that can be or is attached to the latter for transmitting a rotary motion; furthermore an electrical starter motor with a starter shaft pinion that can be driven by it, which electrical starter system is characterized in that a first or bottom holding part and a second or top holding part are provided for fastening the starter motor, optionally provided with a magnetic switch, to a motorcycle frame or a transmission base plate of the motorcycle. The first holding part is configured for connecting to the motorcycle frame, the second holding part is configured for connecting to the starter motor, and both holding parts are configured for connecting to one another. The holding parts are further characterized in that the bottom or first holding part is designed as a plate-like holding element for flat support on, and connection to, the motorcycle frame or the transmission base plate of the motorcycle, wherein a fastening projection associated with the second holding part projects from the free flat side of the plate-like holding element of the first holding part, having an extension of 20% to 90% of the longitudinal dimension of the holding element.

BRIEF DESCRIPTION OF THE VIEWS OF THE DRAWINGS

Further details, features, feature combinations, effects and advantages of the invention can be derived from the following description of the invention and the drawings. Wherein.

The cover as part of the primary drive gearbox is not shown in any of the drawings for the sake of clarity.

DETAILED DESCRIPTION

Figure 1:
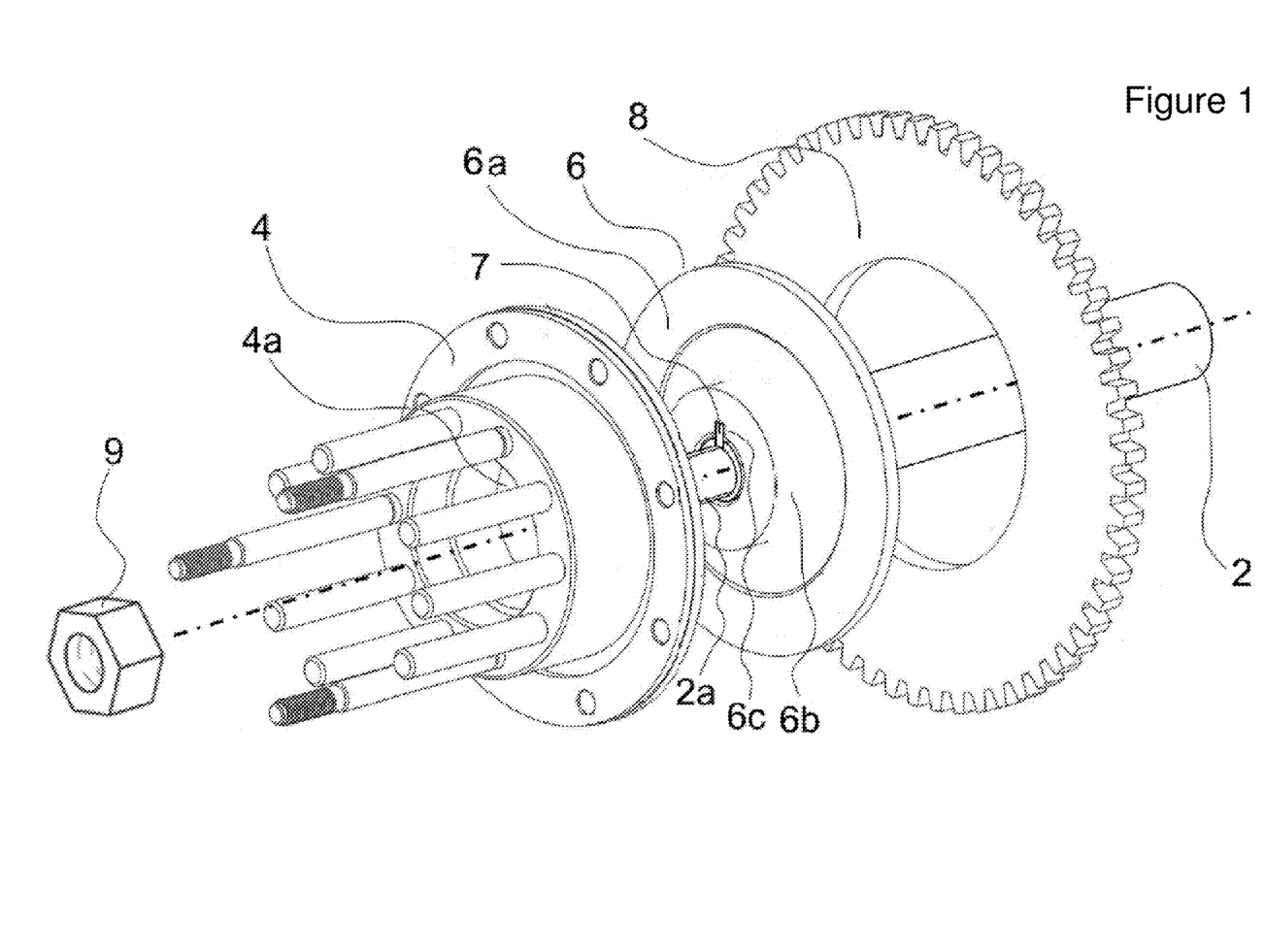
FIG. 1 is a perspective exploded view showing the assembly of the starter gear on the clutch hub

According to FIG. 1, the modified clutch hub 4 is seated on the transmission main shaft 2. The clutch hub 4 is an original component of Harley-Davidson processed within the meaning of the invention such that its cylindrical diameter 4a is concentrically enlarged (not shown). The gearwheel adapter 6, consisting of an annular disc 6a and a projection 6b seated on said annular disc 6a in the direction of the clutch hub 4, follows in positive fit with the clutch hub 4. The adapter 6 can be slid into the clutch hub 4 until it reaches the annular disc 6a. The adapter 6 itself has an inner cone (not shown) which tapers to the left in the direction of travel. It is slid in a form-fitting manner onto an outer cone on the transmission main shaft 2 (not shown). In addition, the adapter 6 has an axial or axially parallel drive slot 6c with which the adapter 6 can be connected in a rotationally rigid manner via an inserted wedge 7 with the transmission main shaft 2. One half of said wedge 7 is inserted in a groove of the transmission main shaft 2, the other half in the drive slot 6c of the adapter 6. The clutch hub 4, the adapter 6, and the starter gear 8 are concentrically welded to one another (welded connection is not shown). These components welded to each other are finally fixed to an outer thread 2a on the left end in the direction of travel of the transmission main shaft 2 using a clutch nut 9, wherein said clutch nut 9 engages behind the projection 6b of the adapter 6.

Figure 2:
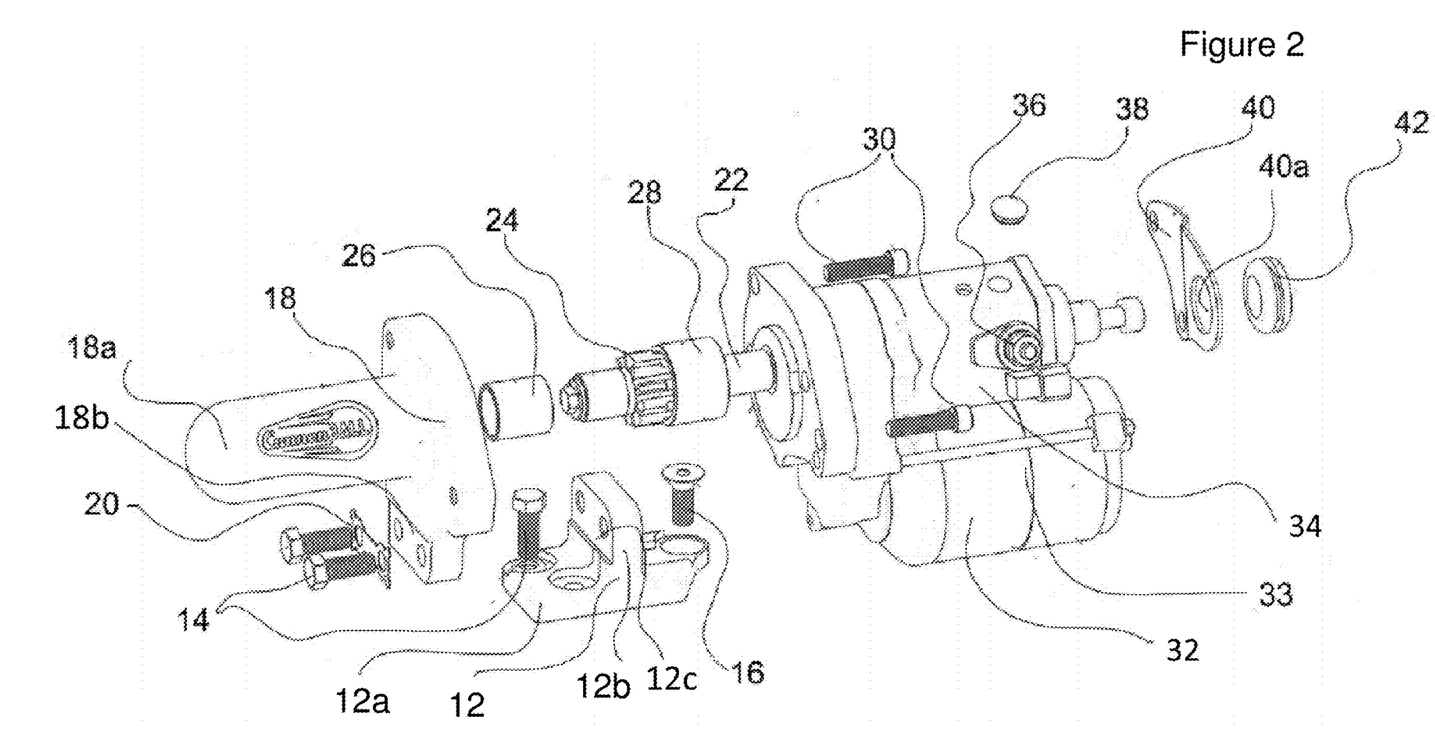
FIG. 2 is a partial perspective exploded view of the starter construction kit with starter motor and brackets

According to FIG. 2, two brackets 12, 18 are associated with the starter motor. The bottom T-shaped bracket 12 is screwed onto a transmission base plate 97 (see FIG. 6) using a hexagon head bolt 14 and a flat head bolt 16 on the plate-shaped holding element 12a. The top bracket 18 with its bell cap 18a, which is optionally visible from the outside, is screwed onto a fastening projection 12b in the center and to the bottom bracket 12 using two hex head bolts 14 and a perforated plate 20 in between. Two integral, complementary or congruent fastening flanges 12c and 18b which extend from the top cover 18 downwards or from the bottom cover 12 upwards, respectively, are for example used for the screwed connection. The starter shaft 22 of the starter motor, on which the starter shaft pinion 24 is seated, is inserted in this bell cap 18a and slidably supported in a friction bearing 26, for example designed as a bronze bushing. The actual starter motor and its casing 33 are screwed to the top bracket 18 using two hexagon socket screws 30. The shaft 22 is connected via an internal transmission together with an intermediate shaft 28 to the rotor in the electric motor 32. The magnetic switch 34 which supplies the electric motor 32 with the magnetic field is located above the electric motor 32 in the casing 33 of the starter motor. A start button 38 is either located directly in the magnetic switch 34 or on the handlebar of the motorcycle. The electrical connection of the starter motor 33 is implemented with an additional cable stop 36 and a cable guide 42, which is fastened to the casing 33 by means of a perforated plate 40 having a passage 40a that is congruent with the cable guide 42.

Figure 3:
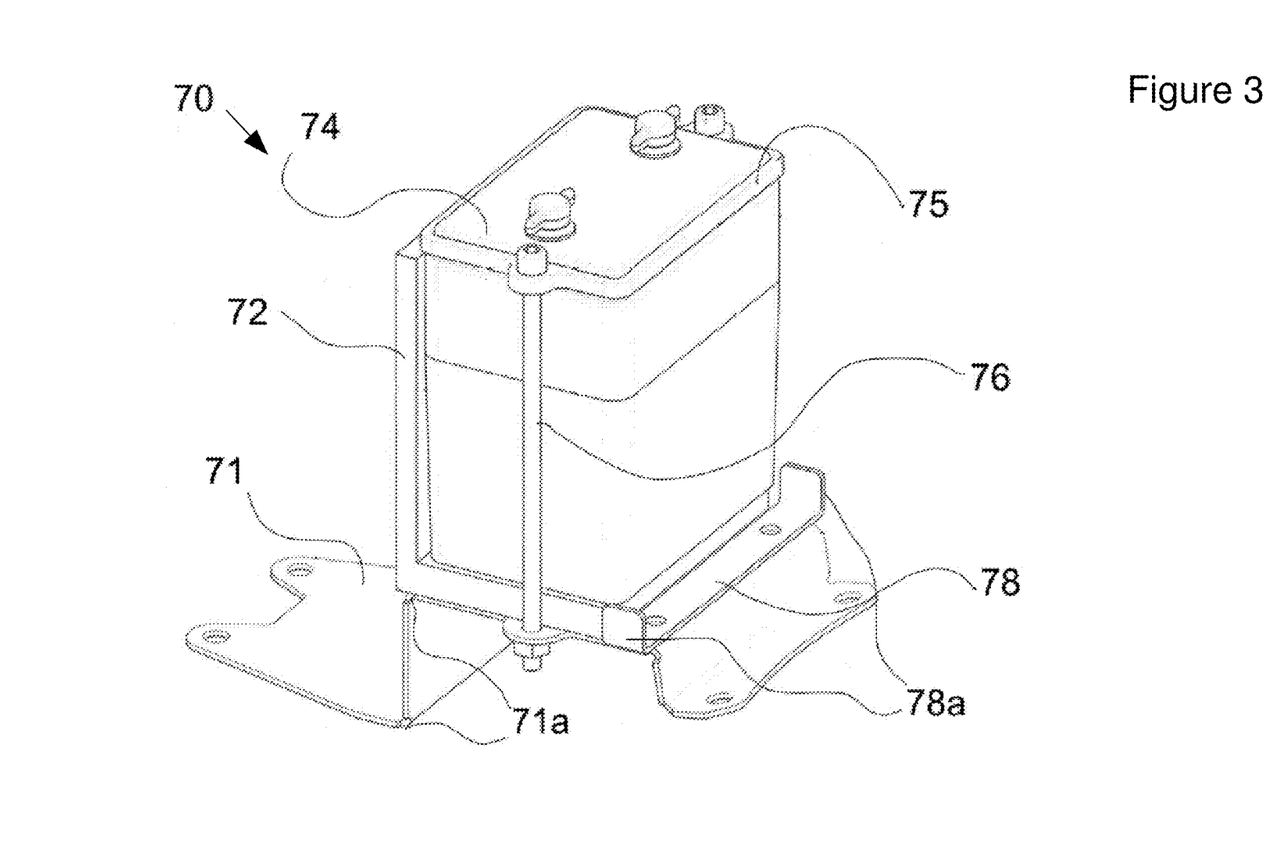
FIG. 3 is a perspective view of the modified battery bracket according to the invention with the battery installed
Figure 4:
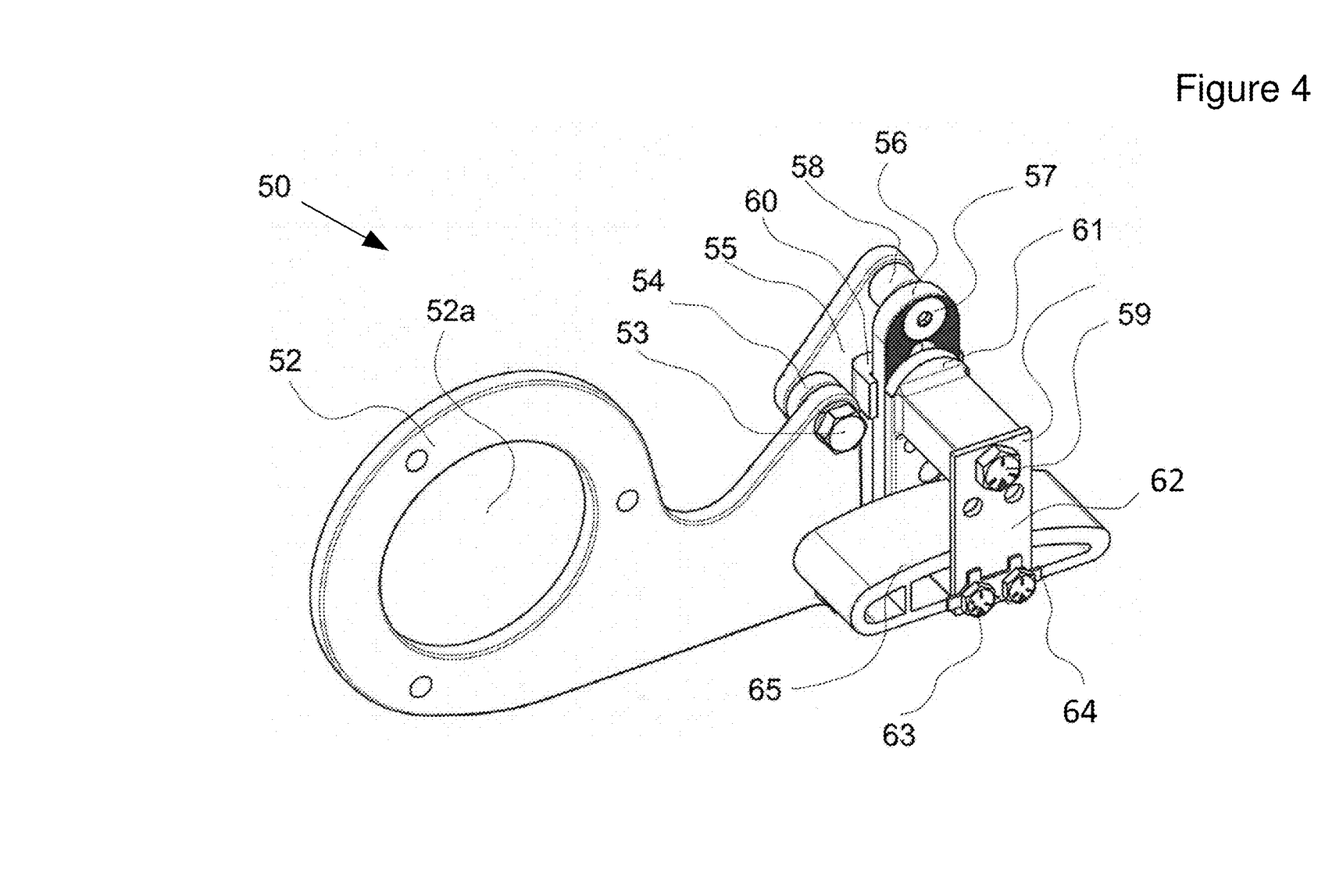
FIG. 4 is a lateral perspective view of the primary chain drive as built from 1955 to 1957
Figure 5:
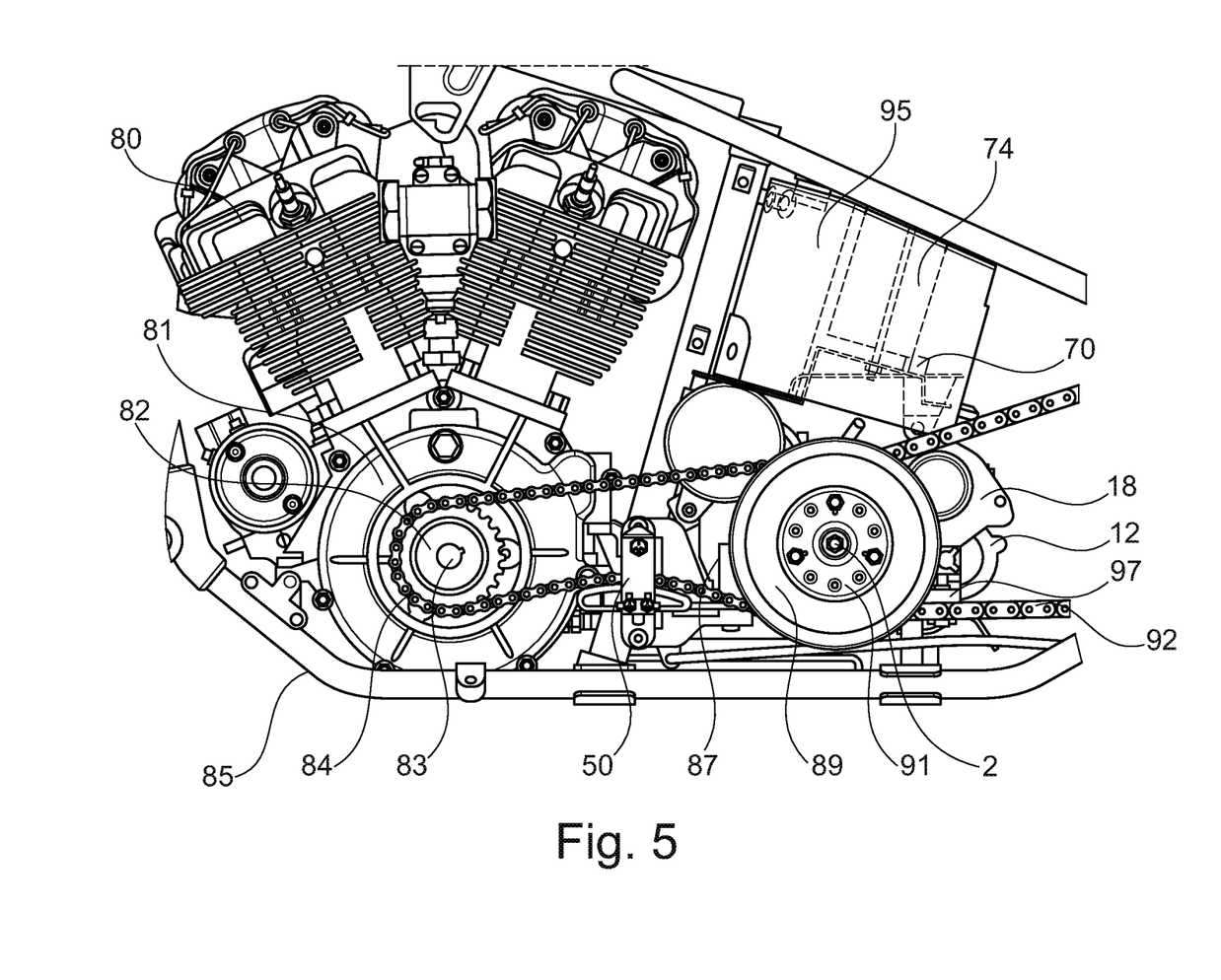
FIG. 5 is a lateral view of a Harley-Davidson motorcycle as built from 1936 to 1954
Figure 6:
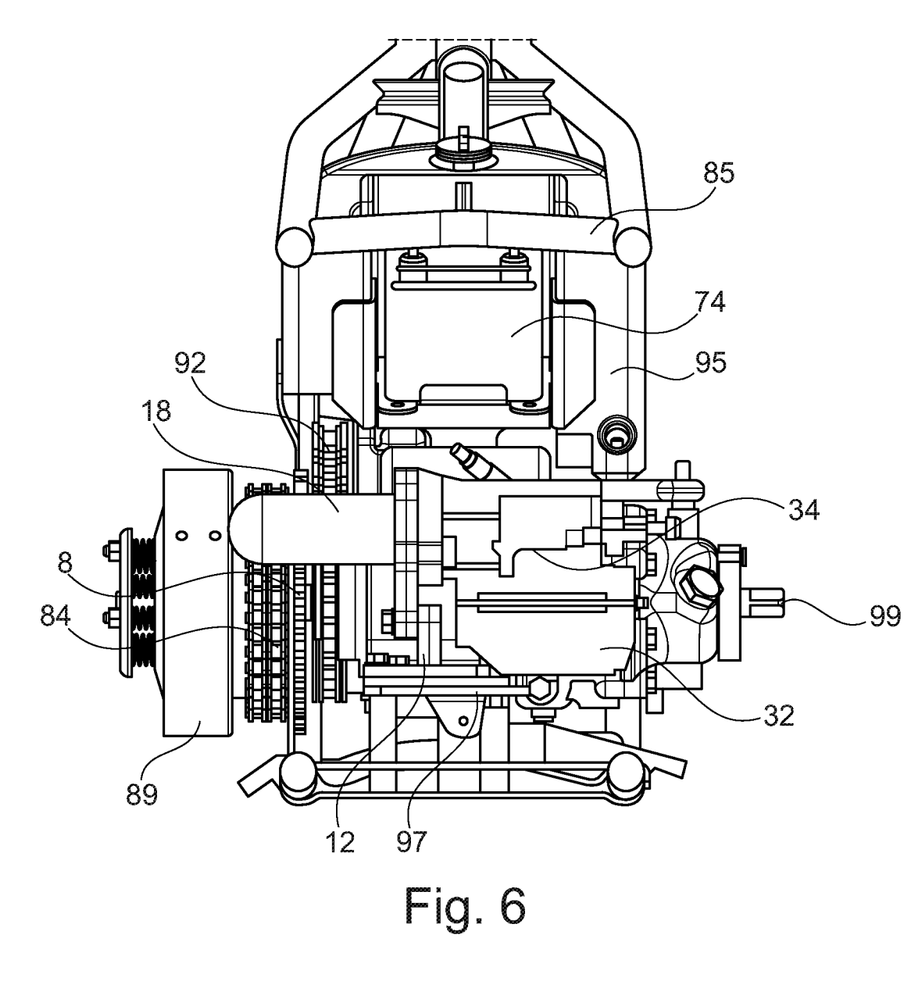
FIG. 6 is a cross sectional view of the electrical starter perpendicular to the longitudinal axis in the direction of travel of a Harley-Davidson motorcycle as built from 1936 to 1957

In a preferred embodiment according to FIG. 3, the new battery bracket 70 according to the invention supports the battery 74 in the center of the horseshoe-shaped oil tank 95 (see FIGS. 5 and 6). The battery 74 and its insulation 72 are fastened with two bolts 76 and a clamping bracket 75 to a battery support plate 71. The design of the battery support plate 71 with two curved right angles 71a and the resulting overall orientation of the battery bracket 70 prevent a collision with the top holding part 18 and/or the starter motor casing 33. A sheet metal bracket 78 is screwed to the battery support plate 71 and welded to the welding points 78a on the oil tank. This allows direct fixation between the battery bracket 70 and the oil tank 95. The battery support plate 71 can be fixedly screwed to the rigid frame 85 of the motorcycle and the rear fender. (see FIG. 5):

According to FIG. 4, a primary chain tensioner 50 as designed for the motorcycles of construction years 1955 to 1957 is provided. A fixing part 52, e.g. made of sheet metal with a circular cutout 52a concentrical to the crankshaft 83 on the crankshaft casing 81 is screwed on for mounting the primary chain tensioner 50 (see FIG. 5, but it shows the embodiment from paragraph [0030]). The fixing part 52 is screwed onto a fastening device 55 via an intermediate piece 54 using two hex head bolts 53, and an anchor plate 56 is seated on said fastening device by means of two flat head bolts 57 and two guides 58 (the lower one of the two screwed connections is not visible). The actual height adjustable chain tensioner 61 is mounted onto said anchor plate 56 using, for example, a hexagonal chain tensioning screw 59 and a chain tensioning nut 60. A chain tensioner plate 62 is attached to this chain tensioner 60 using the chain tensioning screw 59, and the chain tensioning shoe 65 is fastened to said plate using two chain tensioning shoe bolts 63 and a perforated plate 64. The primary chain 84 is slidably supported on said chain tensioning shoe 65 (see FIG. 5). Since the chain tensioning shoe 65 is height adjustable, the primary chain 84 can be retensioned, particularly to counteract wear and tear. This also ensures that a transmission 87 with clutch 89 can always remain at the same position in the rigid frame 85 despite the inevitable lengthening of the chain, and that therefore the starter shaft pinion 24 can always access the starter gear 8 at the same position.

In another embodiment (shown in FIG. 5 in the installed condition) for the motorcycles built from 1936 to 1954, the primary chain tensioner 50 is fastened by screwing onto the transmission base plate 97.

FIG. 5 shows the central section of a Harley-Davidson motorcycle that is representative of the motorcycles built from 1936 to 1957. The inner and outer covers of the primary drive system are hidden in FIG. 5 to make the primary drive system visible. The implementation with the engine 80 and the transmission 87 as physically separated assemblies is typical of motorcycles built in these years. The actual engine 80 is connected to the primary drive system in the crankshaft casing 81 via the crankshaft 83. The output pinion 82 which has a different design depending on the construction year period (panhead or knucklehead engine), is seated on the crankshaft 83. To create extra space on the transmission main shaft 2 for the additional starter gear 8, as described in paragraph [0017], the entire clutch 89 is offset by about 8 mm to the left in the direction of travel on the transmission main shaft 2. For the output pinion of the primary chain 84 on the transmission main shaft 2 to be positioned flush in one plane with the output pinion 82 of the engine 80, the output pinion 82 of the engine 80 must comprise a projection or extension of such a thickness that the gear ring of the output pinion 82 is offset by the same distance. The rotating output pinion 82 transmits its kinetic energy via the primary chain 84 onto the transmission main shaft 2 on which the clutch 89 is seated. During the starting process, power transmission is effected from the clutch 89 to the engine 80. The clutch 89 comprises the clutch cage 91 that is visible here and the modified clutch hub 4 hidden behind it in this view (see FIG. 1) and connects the primary drive chain 84 via the transmission 87 with a secondary drive 92. The latter is used for driving the rear wheel, as is known per se. When the outer cover of the primary drive system is installed, the bell cap 18a (see FIG. 2) of the top bracket 18 is the only component of the retrofit kit that is clearly visible, since the primary chain tensioner 50 remains hidden behind the outer cover. One can see that this in particular is a Harley-Davidson motorcycle built in the period from 1936 to 1954 in that the primary chain tensioner 50 shown in FIG. 5 is mounted to the transmission base plate 97 on the rigid frame 85 and not to the crankshaft casing 81. It is apparent that the starter motor 33 or the top bracket 18, respectively, do not collide with the modified battery bracket 70 which fixes the battery 74 in the center of the horseshoe-shaped oil tank 95 because the maximum permissible installation height is complied with.

FIG. 6 illustrates the layout of the electrical starter system within the rigid frame 85. It is apparent that, due to the design and arrangement of the bottom bracket 12, the top bracket 18, the electric motor 32, and the magnetic switch 34, the available space can be utilized such that the transmission base plate 97, the oil tank 95, and the primary drive system with its primary chain 84 can be kept as original components or equivalent replacement components specific to the respective construction year. This makes it possible to start the engine like before mechanically using the kick starter 99 on the transmission main shaft 2, or electrically by transmitting the rotary motion of the electric motor 32 to the starter gear 8.

The electrical starter construction kit for a method of retrofitting motorcycles of the Harley-Davidson brand built from 1936 to 1957 with an electrical starter system always includes the following components: a modified and completely welded together clutch (reference symbols 4, 6, 8), an electrical starter motor with a mechanical and electronic installation device (12-42), a modified battery bracket (70-78 without 74). Furthermore, the construction kit includes a specific output pinion 82 depending on the respective assembly and an adapted primary chain tensioner 50. The primary chain tensioner 50 for the construction year period from 1955 to 1957 (reference symbol 50-65) is mounted to the crankshaft casing 81, the one for the construction year period from 1936 to 1954 is mounted to the transmission base plate 97. The method for retrofitting is structured as follows:

In preparation for the retrofitting method, the existing battery 74 is removed and the engine oil is drained from the oil tank 95. The following parts are removed one after the other: rear wheel, rear fender, oil tank 95, clutch actuator, outer cover of the primary drive gearbox, clutch 89, primary drive and the existing tensioning screw for the primary chain 84. The existing battery bracket removed from the oil tank 95 and destroyed in the process.

The battery support plate 71 is welded to the oil tank 95. The already welded together modified clutch hub 4 is slid onto the transmission main shaft 2 and used as a template for a cutout along the starter gear 8 on the inner cover of the primary drive gearbox. Then another cutout for the bell cap 18a of the top bracket 18 is made on the inner cover of the primary drive gearbox. Finally, other respective recesses must be made on the inner cover for mounting the primary chain tensioner 50.

After the transmission 87 has been removed from the transmission base plate 97, the bottom bracket 12 is screwed onto the transmission base plate 97 using the supplied and existing screws (14, 16) and nuts. In motorcycles built from 1936 to 1954, the primary chain tensioner 50 is additionally screwed onto the transmission base plate 97.

The transmission 87 and the oil tank 95 can be reinstalled after mounting the bottom bracket 12. After reassembly specific to the construction year of the inner primary cover, the modified clutch hub 4 is completed with the remaining components of the clutch 89, e.g. the clutch cage 91. When assembling the clutch hub 4, the wedge 7 is first inserted in the groove provided for it on the transmission main shaft 2. Then the adapter 6 can be slid in a form-fitting manner to the outer cone of the transmission main shaft 2 and the wedge 7. Then the clutch nut 9 can be used to tighten the modified clutch hub 4 on the male thread 2a of the main shaft to a torque of more than 100 Newton meters. The supplied output pinion 82 is installed and put into operation together with the clutch 89 using methods of established practice.

Then the top bracket 18 of the starter motor 33 can be screwed onto the bottom bracket 12. If required, a cutout can be made on the rear fender using a template. Finally, the electrical cables are installed and the motorcycle can be completely returned to operation in accordance with established practice.

LIST OF REFERENCE SYMBOLS

2 Transmission main shaft
2a Thread on the transmission main shaft
4 Modified clutch hub
4a Inner diameter of the modified clutch hub
6 Gearwheel adapter
6a Annular disc of the gearwheel adapter
6b Projection of the gearwheel adapter
6c Driving element of the gearwheel adapter
7 Wedge
8 Starter gear
9 Clutch nut
12 Bottom bracket
12a Plate-like holding element of the bottom bracket
12b Fastening projection of the bottom bracket
12c Fastening flange of the bottom bracket
14 Hexagon head bolt
16 Flat head bolt
18 Top bracket
18a Bell cap of the top bracket
18b Fastening flange of the top bracket
20 Perforated plate
22 Starter shaft
24 Starter shaft pinion
26 Bronze bushing
28 Intermediate shaft
30 Hexagon socket screw
32 Electric motor
33 Starter motor (casing)
34 Magnetic switch
36 Cable stop
38 Start button
40 Perforated plate
40a Passage through the perforated plate
42 Cable guide
50 Primary chain tensioner 52 Fixing part
52a Circular cutout of the fixing part
53 Hexagon head bolts
54 Intermediate piece
55 Fastening device
56 Anchor plate
57 Flat head bolts
58 Guide
59 Chain tensioning screw
60 Chain tensioning nut
61 Height-adjustable chain tensioner
62 Chain tensioning plate
63 Chain tensioning shoe screws
64 Perforated plate
65 Chain tensioning shoe
70 Battery bracket
71 Battery support plate
71a Curved right angles in the battery support plate
72 Insulation
74 Battery
75 Clamping bracket
76 Bolt
78 Sheet metal bracket
78a Welding section of the sheet metal bracket for fastening to the oil tank
80 Engine
81 Crankshaft/engine casing
82 Engine output pinion
83 Crankshaft
84 Primary chain
85 Rigid frame
87 Transmission
89 Clutch
91 Clutch cage
92 Secondary drive
95 Horseshoe-shaped oil tank
97 Transmission base plate
99 Kick starter

The invention claimed is:

1. An electrical starter system, particularly an electrical starter construction kit for the retrofit of motorcycles of the Harley-Davidson brand built from 1936 to 1957 with a mechanical starting device, wherein the electrical starter system includes the following:
a clutch device (89) that can be coupled to a transmission main shaft (2) of a motorcycle for transmitting rotary motion, wherein the clutch device (89) has:
at least one starter gearwheel (8);
a clutch hub (4); and
a clutch cage (91) that can be or is attached to the clutch hub (4) for transmitting a rotary motion;
wherein the electrical starter system further comprises an electrical starter motor (32) with a starter shaft pinion (24) that can be driven by the electrical starter motor (32) for engaging the starter gearwheel (8) of the clutch device (89);
wherein the starter gearwheel (8) is or can be mechanically coupled to the clutch hub (4) for transmitting a rotary motion to the clutch hub (4);
characterized in that a gearwheel/hub adapter (6) is disposed between the clutch hub (4) and the starter gearwheel (8) for coupling the clutch hub (4) to the starter gearwheel (8);
wherein the gearwheel/hub adapter (6) is or can be coupled in a rotationally rigid manner to the starter gearwheel (8) and the clutch hub (4);
wherein the gearwheel/hub adapter (6) is connected or can be coupled in a rotationally rigid manner to the transmission main shaft (2) of the motorcycle; and
wherein the clutch hub (4), the gearwheel/hub adapter (6), and the starter gearwheel (8) are arranged together one after the other on the transmission main shaft (2).

2. The starter system according to claim 1, characterized in that the starter gearwheel (8) is coupled to the clutch hub (4) by welding or another positive, frictional, or cohesive connection or adaptation.

3. The starter system according to claim 1, characterized by one or more driving elements (6c) configured in the gearwheel/hub adapter (6) which are disposed for torque-transmitting engagement with the transmission main shaft (2) of the motorcycle.

4. The starter system according to claim 1, characterized in that the starter gearwheel (8) is arranged, or its outer diameter is dimensioned, such that it can be covered by an outer primary cover or a primary drive gearbox of the motorcycle.

5. The starter system according to claim 1, characterized by an output pinion (82) that can be mounted to a crankshaft (83) of the motorcycle and is designed with a projection or extension of such thickness and orientation that an offset of a primary chain drive (84) on the transmission main shaft (2) of the motorcycle is compensated by said thickness and orientation such that the primary chain drive (84) of the motorcycle is flush in a plane corresponding to the offset.

6. The starter system according to claim 1, further comprising a magnetic switch (34),
characterized in that the starter motor (32) and the magnetic switch (34) are arranged one below the other.

7. The starter system according to claim 1, characterized by a battery support device (71) for bottom-gripping or supporting a battery (74) of the motorcycle, and
wherein the battery support device (71) is adjustable to prevent a mechanical collision with a top holding part (18) or a starter motor casing (33).

8. The starter system according to claim 1, characterized by a chain tensioning device (50) configured for fastening to a transmission base plate (97) or to a crankshaft casing (81) of the motorcycle for retensioning a primary chain (84).

9. The starter system according to claim 1,
wherein a first or bottom holding part (12) and a second or top holding part (18) are provided for fastening the starter motor (32) to a motorcycle frame (85) or a transmission base plate (97) of the motorcycle,
wherein the first holding part (12) is configured for connecting to the motorcycle frame (85), the second holding part (18) is configured for connecting to the starter motor (33), and both holding parts (12, 18) are configured for connecting to one another,
characterized in that the bottom or first holding part (12) is a plate-shaped holding element that provides a flat support for connection to motorcycle frame (85) or the transmission base plate (97) of the motorcycle,
wherein a fastening projection associated with the second holding part (18) projects away from a free flat side of the plate-shaped holding element of the first holding part (12), the fastening projection having an extension of 20% to 90% of a longitudinal dimension of the holding element (12).

10. The starter system according to claim 9, characterized in that at least one of the first or second holding part (12, 18) is an iron casting.

11. The starter system according to claim 9, characterized in that the first holding part and the second holding part are connected;
> wherein the first and second holding parts are configured for being mounted to a position that is located on a retrofitted motorcycle in a sectional view perpendicular to a longitudinal axis in the direction of travel of the motorcycle, and between the starter motor (32) and a gearwheel of a secondary drive (92) of the motorcycle.

12. A motorcycle equipped, retrofitted, or provided with an electrical starter system according to any one of the preceding claims.

\* \* \* \* \*